United States Patent
Bassin et al.

(10) Patent No.: US 6,651,741 B2
(45) Date of Patent: Nov. 25, 2003

(54) METHOD OF INCREASING PRODUCTIVITY OF OIL, GAS AND HYDROGEOLOGICAL WELLS

(75) Inventors: Yakov Bassin, Belmont, MA (US); Valentin T. Grebennikov, Moscow (RU); Boris Goldstein, Hillsborough, CA (US); Anatoly N. Ivanov, St Peterburg (RU); Leon M. Marmorshteyn, San Mato, CA (US)

(73) Assignee: 1407580 Ontario Inc., Toronto (CA)

( * ) Notice: Subject to any disclaimer, the term of this patent is extended or adjusted under 35 U.S.C. 154(b) by 21 days.

(21) Appl. No.: 09/976,908

(22) Filed: Oct. 13, 2001

(65) Prior Publication Data

US 2003/0070805 A1 Apr. 17, 2003

(51) Int. Cl.$^7$ ............................................. E21B 43/28
(52) U.S. Cl. ........................................ 166/268; 166/265
(58) Field of Search ........................ 166/55, 212, 297, 166/223, 298, 269, 265, 268, 272.6, 55.6

(56) References Cited

U.S. PATENT DOCUMENTS

| | | | | |
|---|---|---|---|---|
| 4,134,453 A | * | 1/1979 | Love et al. ................. 166/298 |
| 4,619,318 A | * | 10/1986 | Terrell et al. ................. 166/55 |
| 5,361,856 A | * | 11/1994 | Surjaatmadja et al. ........ 175/67 |
| 5,445,220 A | * | 8/1995 | Gurevich et al. ............. 166/55 |
| 6,070,677 A | * | 6/2000 | Johnston et al. ............. 175/57 |
| 6,167,968 B1 | * | 1/2001 | Allarie et al. ................ 166/298 |

* cited by examiner

Primary Examiner—Frank Tsay
(74) Attorney, Agent, or Firm—J. Zborovsky

(57) ABSTRACT

A method of increasing the productivity of oil, gas and hydrogeological wells has the steps of performing a slot unloading, providing a cyclical treatment of a near well zone with a formation-treating substance, with a use of cutting slots, determining a region to be treated, selecting a corresponding volume of a treating technological composition, and introducing the volume into a formation to be treated, and subdividing the method into a two stages including a first stage performed by a partial slot unloading of a near well zone so as to remove a main part of support stresses, and a second stage of removing a remaining part of support stresses by a cyclical treatment of the well with a formation-treating substance with control by the density of the rock to be treated and performing a corresponding correction.

18 Claims, 3 Drawing Sheets

METHOD OF INCREASING PRODUCTIVITY OF OIL, GAS AND HYDROGEOLOGICAL WELLS

BACKGROUND OF THE INVENTION

The present invention relates to the oil and gas industry. The Abrasive Hydrojet Perforation Technology offers an effective means to communicate the wellbore with the target formation and to achieve more effective completion due to an increase of flow area, bypassing the damage in a near-wellbore zone and reduction of the compressive stresses The invention represents a new method of treatment of a near-well zone of the producing formation with a combination of chemical treatment.

It is known that flow from productive zones can be increased by slotting and chemical treatment. Slotting allows redistribution of the mechanical stresses in the near well zone, while chemical treatment allows increased productivity of the wells. However, the first method is very labor consuming and requires high costs. In order to shot three feet of the productive interval some time it is necessary to spend up to three hours of pumping unit operation, which is an expensive operation. The chemical action also treats the near well zone, but it requires a primary opening of the formation and does not remove a zone of support pressure which is a main reason of locking of the passages for fluid flow into the well. The first method is very efficient and increases the productivity of wells on average several times, however it is expensive. In order to provide maximum effectiveness or completely restore the potential productivity of wells, it is usually necessary to provide a subsequent treatment with formation-treating reagents.

Some of known solutions are disclosed for example in U.S. Pat. No. 3,965,982; patent document WO94/05898; SU 10472234; SU 1031263; SU 1167925; "Method Recommendations for Increase of Permeability of near Well Zone by slot Loosening" by Ministry of Geology USSR, PTO "SEIMORGEOLOGIA", L., 1984; I. N. Ivanov, et al "Flow-in of Fluid to Well with the Use of Various Methods of Opening of Productive Formations", Geophysical Magazine, 1984, no. 5; V. A. Sidorovski "Opening of Formations and Increase of Productivity of Wels", M., Ndera, 1978, P111; "Method of Recommendations of Increase of Permeability of near Well Zone with Slot Loosening", Nii Geology Arctics, Mingeologii USSR, L. 1979.

The method disclosed in SU1167925 is the closest to the present invention. It is a combined method for the increase of productivity, which includes slotting of the well and cyclic acid formation treatment. The slotting is performed in accordance with known "classic" recommendations in order to obtain a maximum possible effect, while the cyclic acid treatment is performed also in accordance with the known method described in the above mentioned documents, for a depth which is not less than 5 diameters of the well, so as to attempt to completely use its possibilities without the consideration of the results of slotting or control of the results of each cycle. The cyclical "periodic" treatment of a well was performed by a reagent solution whose volume was determined from a mass and porosity of rock adjoining a shaft of the well, at a distance of approximately two diameters from the well. Each cycle of treatment is performed by pressing of a calculated volume of solution into the formation to be treated, which is preliminarily limited from above and from below by packers. The treatment in some sense is performed blindly, the results were evaluated in accordance with a change of productivity of the well. The cycles of treatment continued until the time when repetition did not lead to a change in productivity.

It has been shown from practice that this method which includes a complete slotting with a subsequent complete treatment with technological reagents has a universal action on the formation and provides an increase of well productivity, an equalization of a profile of advancement of a front of water pumped into a formation for maintaining of the formation pressure, an increase of the oil yield of the formation. Because of these advantages this method has been widely utilized. It also has been used during exploration and drilling of new wells. Moreover, it was made possible with this method to explore and efficiently use wells in low-production formations of Western Siberia in which the oil flow is less than 30 bbl per day. This method therefore is efficient. However, this method, similarly to the other methods has a limitation as to its possibility and efficiency. It is expensive, labor consuming and does not guarantee obtaining of the maximum possible increase of well productivity. The method is used without consideration of negative action of elevated stress concentrations, which are formed near the wellbore.

It is known that the maximum stresses in the near well zone are generated within one diameter of the well or approximately 0.6 ft., and the maximum stress directly adjoins the walls of the well (FIG. 1). The plastic zone in this case can be not considered, since in accordance with the calculation its width at the depth of 10,000 ft. is only 0.03 ft. It is also known that during the process of the drilling of wells, even after carrying out slotting, a zone of support pressure remains near it. The slotting removes only a part of these stresses, which is equivalent to a reduction of depth of the well approximately 1.5 times. During slotting at the depth of 10,000 ft. it is equivalent to a reduction of stresses to the depth of 6,600 ft. However, the mode and parameters of acid treatment (or treatment with other reagents, such as technological compositions) nowadays are determined without consideration of negative influence of the remaining stresses near the well. The zone of support pressure, which remains around the well, is not taken into consideration and parameters of treatment with technological compositions are calculated from the condition of action of a uniform supply of active technological solution per volume unit of a formation.

However, experimental observations and analytical investigations showed that the influence of zone of support pressure near the well is significant. If this influence is not taken into consideration, false conclusions can be made with respect to the productivity of the wells. Based on the results of the treatment, it is considered that a low oil yield from a formation can be explained by a week natural permeability of the formation itself, while a real cause is the reduction of permeability only within limits of the zone of support stresses, caused by stress concentration beyond the wellbore.

SUMMARY OF THE INVENTION

Accordingly, it is an objective of the present invention to reduce labor consumption and cost of treatment of a well, without a reduction of efficiency of treatment, time of use of wells, and gas/oil yield of productive formations.

In keeping with these objectives and with others which will become apparent hereinafter, one feature of the present invention resides, briefly stated, in a method for increasing production of oil, gas and hydrogeological wells, which includes Abrasive Hydrojet Perforation Technology (AHPT) and a cyclical treatment of a near well zone with a formation treating reagent, with cutting of slots, determination of a productive zone, and a corresponding volume of a treating technological composition, and introduction (pressing through) of the volume into a formation to be treated, in which in accordance with the present invention the method is performed in two stages so that in the beginning a partial Abrasive Hydrojet Perforation of a near wellbore zone is performed so as to redistribute stresses, and then a remaining part of the support stresses is removed by a cyclical treatment of a well with a formation treating reagent with its control in accordance with the density of the formation to be treated and with a corresponding correction.

The following is a short summary of the benefits, improvements and the most promising applications of Abrasive Hydrojet Perforation technology:

The Abarsive Hydrojet Perforation Technology (AHPT) slotting provides a very precise, reliable and controllable method to establish a large inflow path between the cased borehole and the formation. The inflow area of an 8-in per foot dual slot is equivalent to 36 spf of 0.75-in shaped charge holes. Moreover, the pressure drop on AHPT slot is significantly less then on the areal equivalent set of perforated holes. In addition, the AHPT cutting process is much more robust in creating a low-resistant flow path, even with two strings of casing AHPT slotting preserves the integrity of the cement bond. This can be critical for zonal isolation when the perforated intervals are in close proximity to water or a gas cap. The integrity of the cement sheath also increases the casing strength and resistance to failure.

The created AHPT slots simplifies the fracture initiation and therefore may significantly reduce the near wellbore problems (multiple fracturing, tortuosity, etc.). This reduces the chances of NWB screenouts during fracture stimulation and minimizes the choking non-darcy effect because of the tortuous path during production (esp., in gas wells).

AHPT slot geometry (with the penetration depth up to 4–10 ft) bypasses the near wellbore mud invasion zone and increases the drainage area. This suggests that AHPT slotting in clean, high permeability sands is the preferred completion method. If these clean formations require sand control, AHPT slotting can be used in combination with high rate water packs. For laminated formations, AHPT slots in combination with F&P should result in consistent negative skin completions.

AHPT cutting does not reduce the near wellbore strength of the formation, as does conventional shape charge perforating. Under some circumstances, this AHPT feature in combination with a larger created drainage area may allow a natural completion of formations that currently require sand control.

The slots modify the stresses in near the wellbore zone (relaxed in zone adjacent to the slots, and increased at the tip zone). Formations with strong stress-dependant permeability may encounters significantly reduced completion skin. Moreover, for deep and relatively hard formations. slotting may achieve compressive fracturing in the near wellbore region that results in a significant permeability increase at a distance of several slot diameters and dramatic reduction of the near wellbore conversion pressure drop. In gas wells it will reduce (or completely eliminate) sometimes very large non-darcy skin.

In order to optimize the method, the partial Abrasive Hydrojet Perforation is performed by cutting slots only in a surrounding column, cement layer and a part of the productive zones of the fromation.

This method allows cutting slots in a thin productive zone and in the case when the productive layer is not far away from water horizons. Abrasive Hydrojet Perforation is preformed by fluids, which includes water and quartz sand. This allows preserving the integrity of cement and leads toward higher penetration into the formation compared to other technology and methods (conventional perforation, hydrofracturing).

The technology can be divided into surface and underground equipment (FIG. 2). Underground equipment includes an engine with nozzles, which is connected to surface pumping units (FIG. 3). For Abrasive Hydrojet Perforation, hydrojet perforators (11) are used; for single slotting the perforator is used with 4 nozzles. Nozzles are located 180 degrees across from each other. The distance between nozzles is around 4". The abrasive fluid is recycled all of the time during the process. In addition underground equipment includes (FIG. 3): underground engine (8), engine switch (9) and hydrojet perforator (11). This equipment can slot in one session three intervals with the approximate length of 3 ft. each. After that perforators must be changed. Description of the slotting technique is shown on (FIG. 4).

Surface equipment includes (FIG. 2) pumping units, mixer blender for sand/water, block manifold, filters and connectors. Pumping units for Abrasive Hydrojet Perforation can be used with the following characteristic: 5,00–10, 000 psi, depending on well depth, and continuous working capacity of 6 hours.

Abrasive fluids prepared in blender. Filters are used to filter fluids and separate water for the recycling process. Quartz sand can be used as the abrasive material with quartz consumption not less then 50%.

During the Abrasive Hydrojet Perforation it is preferable preliminarily to determine the porosity and permeability of the production formation of the near wellbore zone, and the depth of the zone of support stresses, and to perform the subsequent treatment in dependence on the porosity and depth.

In particular, when the rock has a porosity of approximately 15% and higher, the Abrasive Hydrojet Perforation is performed at the depth of 1–1.5 well diameters, with the porosity of less than approximately 15% the Abrasive Hydrojet Perforation is performed at the depth not less than four well diameters.

In the first case, this reduces the time and cost of treatment almost in half, and in second case it guarantees achieving of the maximum possible effect. Moreover, during a subsequent cyclic treatment with technological reagents in order to increase permeability of the zone of remaining support stresses, between each treatment a radius of a zone of support pressure and a maximum acting stress in it are determined and the treatment is performed on a part of the formation which adjoins the well, including a zone of the support pressure. After each cycle of treatment, a change of density (permeability) of the formation in the zone of support pressure is controlled.

In order to optimize the method, the treatment is stopped when the density of the formation in the zone of support pressure is reduced by a predetermined value, which is determined in accordance with the formula:

$$\Delta \rho \geq K \rho (\sigma_y - \gamma \cdot H)/E,$$

wherein K is a factor of efficiency of treatment,

ρ is the density of the formation of a not disturbed formation at the depth, lb/ft$^3$ σ is the maximum stress acting in the zone of support pressure MPa, γ is the specific weight of rock of the formation, lb/ft$^3$, E is an elasticity modules of formation rock, MPa.

It is also proposed in accordance with the present invention to use a technological solution with an acid reaction of flow, which interacts with a clay component of colmatating portions and a matrix of rock of a productive formation, whose composition is selected in accordance with the nature of the rock of the productive formation of a near well zone.

In particular, with a terrigen collector of the productive formation, the technological solution is a solution of $NaHSO_4 \times H_2O$ and/or $K_2S_2O_7$ and/or $(NH)_4S_7O_6$ with concentration of 4–7%, with additions of anion active surface active substances or mixture of anion active and noionogenic surface active substances within the concentrations 0.5–2%.

If in a terrign collector, there is a carbonate component more than 30% and if there is a carbonated collector of the productive formation, the technological solution can be a solution of $NH_2SO_4H$ with addition of anion active surface active substances or a mixture of anion active and non ionogenic surface active substances within the concentrations 02–04% and polyphosphates within the concentration 0.1–0.2% or a solution of $CH_3COCl$ with concentration 6–12% with admixtures of anion active surface active substances or a mixture of anion active and non ionogenic surface active substances within the concentration 0.5–1% or polyphosphates within the concentrations of 0.1–0.2% and as polyphosphates, there are used in $Na_5P_3O_{10}$ and/or $Na_2[Na_4(PO_3)_6]$.

In accordance with a further advantageous feature of the present invention, the formation treatment fluid (technological solution) is formed directly in a well within an interval of a formation to be treated, for example by enclosing of chemical agents for preparation of a solution into a transport package, transporting the package to the formation to be treated, and then removing the package for example by its dissolution with a solution in the well or by supplying of a dissolving liquid.

The transporting package can be formed as a micro container or capsule with a dissolvable enclosure formed, for example as a water soluble polyethylene film. The container can be also composed of a binding material, for example starch which is water soluble without the residues and consequences. Containers can be formed as balls or cylinders.

Thus, the new features of the present invention include a combination of operations, such as performance of the method in two stages with a primary controlled partial Abrasive Hydrojet Perforation and a subsequent controlled and regulated cyclical treatment of a well with a formation-treating agent, cutting of slots only in a surrounding column, a cement layer and a part of the rock of the collector immediately adjoining the well, preliminary determination of porosity of the rocks of the productive formation of the near well zone and a depth of a zone of support stress, and correction of a further treatment depending on the porosity and depth, determination of a radius of zone of support pressure and a maximum acting stress in it before each cycle of the formation treatment, carrying out of the treatment of all parts of the adjoining formation to the well including a zone of support pressure, controlling of a change of density (permeability, porosity) of rocks in the zone of support pressure after each treatment, stopping of the cyclical treatment when density of the formation in the zone of support pressure is reduced by a predetermined value, change of volumes (radii) of a mass which is treated in stages, selection of compositions of technological solutions and their preparation directly in a well in an interval of a treating formation. These features provide an unexpected result, which is a significant reduction of labor consumption and cost of the method without a reduction of efficiency of treatment and long-term stabilization of the obtained effects. These results are unobvious and inventive.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
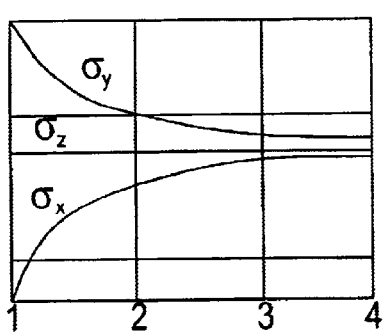
FIG. 1—description of σ in Abrasive Hydrojet Slotting Perforation

In the drawings the following symbols are utilized:

$\sigma_x, \sigma_y$ are a vertical and a horizontal stress, $\sigma_{y1}$ is a remaining maximum stress in a zone of support stresses before a beginning of a formation treatment (after a partial Abrasive Hydrojet Perforation), $\sigma_{y2}$ is a remaining maximum stress in a zone of support of stresses after a first cycle of formation treatment, γH is a remaining maximum stress in a zone of support stresses after the end of formation treatment, $r_1$ is a radius zone of remaining support stresses before the beginning of formation treatment (after a partial Abrasive Hydrojet Perforation), $r_2$ is a radius of a zone of remaining support stresses after a first cycle of formation treatment, $r_3$ is a radius of zone of reduced support stresses around the well after a first cycle of formation treatment.

DESCRIPTION OF THE PREFERRED EMBODIMENTS

It is known that a maximum stress in a near wellbore zone within one diameter of the well shown in FIG. 1 is approximately 0.6 ft. The maximum stresses directly adjoin the walls of the well. In the present invention it is permissible not to consider a plastic zone, since in accordance with calculations its width at the depth of 10,000 ft. is only 0.4".

It is therefore proposed to reduce and redistribute the maximum stresses without a complete cutting of an unloading slot. This significantly accelerates and reduces the cost of the method. Then it is suggested to remove the remaining part of stresses in the zone of support pressure with another method (formation treatment) with labor consumption which is lower than usual. As a result, a desired corridor for movement of useful fluids into the well is formed in a reliable and less labor consuming method.

The corresponding operations of the method include the following sequence.

Before the beginning of works, porosity and density of a formation is evaluated by geophysical methods. For example the porosity is determined by a neutron logging, while density is determined in accordance with a density logging. If the porosity is higher than approximately 15%, the speed of movement of the perforator is selected to be 1.5 hours for 3 ft., instead of the conventional three hours for 3 ft. In this case, a surrounding pipe, cement and a main part of the area of increased stresses will be cut through, and directions for pumping of a formation treatment solution are created. The solution, in addition to a conventional dissolution of cementing substance of the productive formation, performs pressurization of rock of the productive formations and therefore increases support stresses.

If the porosity of rock is less than approximately 15%, the Abrasive Hydrojet Perforation is performed in accordance with the traditional method, with a speed of cutting of the slot about three hours for 3 ft. After this, because of the formation of a great draining surface a more reliable depressurization of rock in the zone of support pressure is performed, and a maximum reduction of stresses in the near well zone is obtained.

The formation treating reagent can be for example a solution of hydrochloric acid (for carbonate rock and for terrigen rock with a significant content of carbonate cement).

Figure 5:
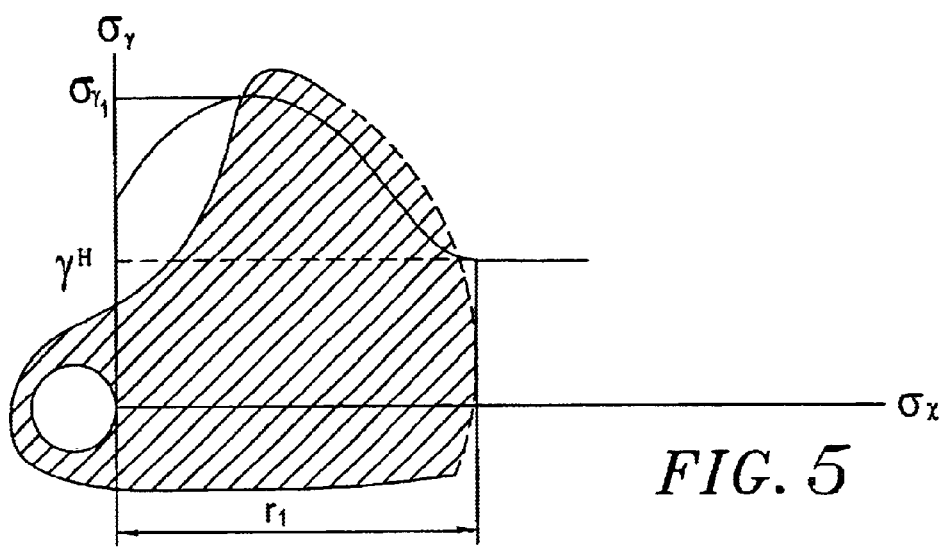
FIGS. 5, 6, 7 are views showing a distribution of stresses in a near well zone before the beginning of a cyclical treatment, after a first cycle of treatment, and after the end of treatment correspondingly.

Initially, the remaining stress-deformed condition of the rock in the near well zone is evaluated, and based on it; a pattern of distribution of support stresses is determined as represented by a curve 1 in FIG. 5.

The stress condition is evaluated by experimental methods. In wells which do not have surrounding tubes, it is necessary to use electrometric and ultrasound methods. In wells, which are provided with surrounding tubes, it is possible to use a method of radioactive (density and neutron) logging. It is also possible to use analytical methods for the calculation of parameters of the zone of support pressure.

Based on the evaluation of the stress condition, a zone of support loads and a compaction of rocks with radius $r_1$ (FIG. 5) is determined and a volume of rocks is calculated, within limits of a cylindrical column near a well, which are to be subjected to a preliminary treatment $$V_{r_1} = \pi(r_1^2 - r_2^2)m,$$

wherein m is a thickness of a formation-collector, $r_c$ is a radius of the well.

In correspondence with this volume, a volume of an acid solution for pumping (pressing through) into a near well zone of formation is determined:

$$V_{p_1} = V_{r_1} \cdot n,$$

wherein n is the porosity of the rock of a formation-collector.

Figure 6:
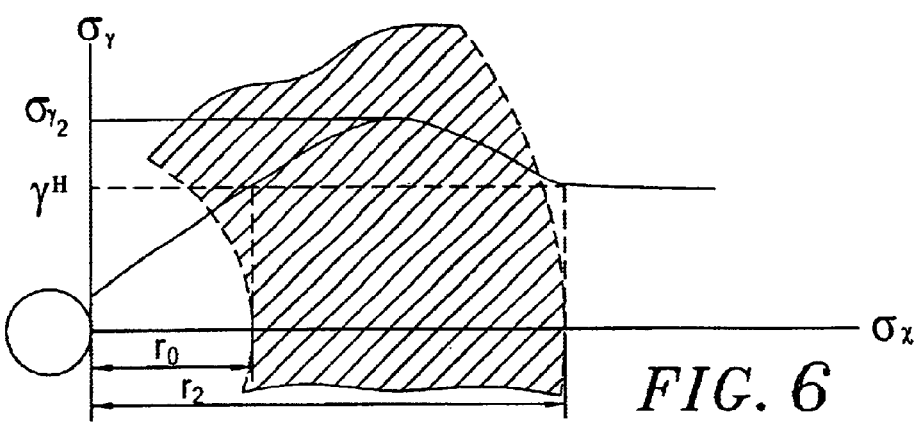

This portion of solution is pumped into the well, pressed into a near well zone of formation for action on the zone of support pressure. As a result of this action, dissolving of both the cement of rock and the rock itself is performed. When the dissolved mass is withdrawn, density of the rock and action in this zone of stresses is reduced. The evaluation of the obtained effect of depressurization is performed by the geophysical methods. The efficiency of treatment with a first cycle can be insufficient. FIG. 6 shows that as a result of the first cycle of action, a certain effect is obtained, which is a reduction of maximum value of stresses to the value $\sigma\gamma_1 < \sigma\gamma_2$. Near the wall of the well, a ring of reduced stresses with a radius $r_o$ is obtained. However, within the interval $r_2$ stresses continue to act, which exceed initial stresses of the untouched mass.

In this case a second cycle of pumping is performed in accordance with the same or reduced parameters. A change of quantity of the pumped solution to increase the volume $Vp_1$ is necessary in the case if an exterior radius of a ring of compaction is increased $r_2 > r_1$.

After the second cycle of action, again a control of efficiency is performed and the necessity of a subsequent treatment of the zone is determined.

Figure 7:
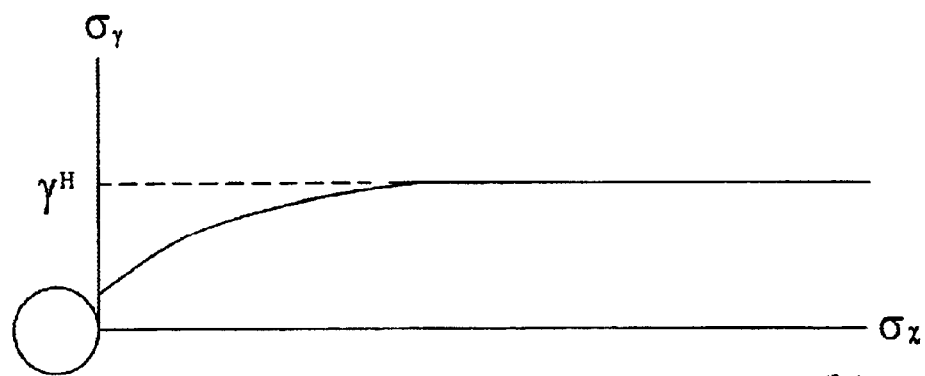

An ideal result of the treatment is a complete removal of a "splash" of support loads when in the vicinity of a well a "funnel" of stress "is formed, which is characterized by a pattern of monotonous increase of stresses and density of rocks from a wall of the well into a depth of the mass as shown in (FIG. 7).

The achievement of this pattern is not always necessary. Even a partial depressurization of the rock in the zone of support pressure can provide a sufficient effect of increase in well productivity. Therefore, a factor of efficiency of treatment K is introduced, which characterizes a given critical level, in accordance with which it is necessary to reduce stresses acting in a support zone.

$$K = \frac{\delta_{y_1} - \delta_{y_2}}{\delta_{y_1} - \gamma H},$$

Figure 3:
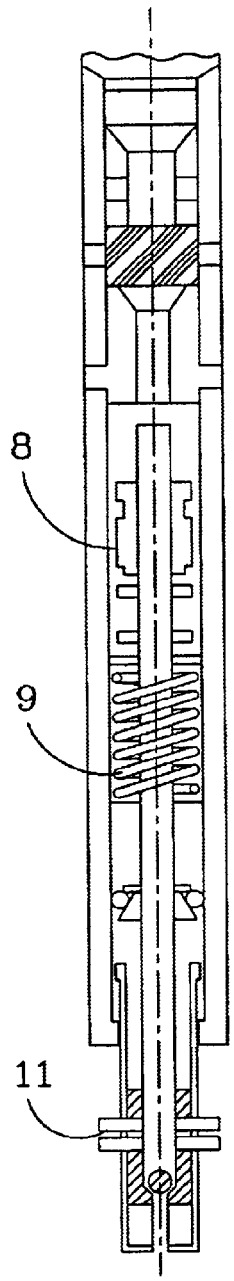
FIG. 3—underground equipment used for Abrasive Hydrojet Slotting Perforation.

The value K>1 corresponds to a complete unloading of rocks in the zone of support pressure as shown in FIG. 7. Values 0<K<1 correspond to a partial unloading of rocks as shown in FIG. 3. In practice the coefficient K is determined experimentally, but as a rule it cannot be equal to 1.

Removal of a "threshold of compaction" in the zone of support pressure in certain conditions increases the productivity of the well, not more than by 15%, which is summed with the effect of Abrasive Hydrojet Perforation.

As for the selection of concrete composition of technological solutions for this treatment, it should be mentioned that for treatment of a terrigen collector of productive formation, there are utilized solutions of $NaHSO_4 \times H_2O$ and/or $K_2S_2O_7$ and/or $(NH)_4S_7O_8$ with concentration 4–7% with additions of anion active surface active substance or a mixture of anion active and non ionogenic surface active substance with concentrations 0.5–2%. The destruction of clay colmatating regions with this technological solution is performed by disturbance of coagulating contacts between clay aggregates of colmatating regions, dissolution of admixtures, cementing sand, and dealkylization of alumosilicates which form carcasses of clay aggregates.

When in a terregin collector there is a carbonate fraction of higher than 30% and when there is a carbonate collector of the productive formation, then a technological solution with an acid reaction can be a solution of $NH_2SO_3H$ with admixtures of anion active surface active substance and a mixture of anion active and non iongenic surface active substance with concentration 0.2–0.4% and polyphosphates with concentration 0.1–0.2% or a solution of $CH_3COCl$ with concentrations 6–12% with admixtures of anion active surface active substance or a mixture of anion active and non ionogenic surface active substance with concentration 0.5–1% and polyphosphates with concentration 0.1–0.2%, and as polyphosphates $Na_5P_3O_{10}$ and/or $Na_2[Na_4(PO_3)_6]$ are utilized.

Sulphamine acid actively dissolves carbonate rocks. When an acethyle chloride is dissolved in water, a mixture of asetic and hydrochloric "acid is formed in a condition of active temperature increase:

which also provides a dissolution of carbonates in a thusly formed rock area.

The utilization of agents of complex-forming action in the composition of a carrier liquid in the case of $Na_5P_3O_{10}$ and/or $Na_2[Na_4(PO_3)_6]$ stabilizes the technological solutions and prevents a secondary deposition of calcium in the case of very low concentrations which are not sufficient for binding of deposited cations into soluble complexes. The stabilization effect of such very small admixtures is connected with adsorption processes. Phosphate and ions are adsorbed on seeds or growing crystals, block active centers and therefore prevent precipitation of salts. As a result of laboratory tests for dissolving of carbonate rocks with such technological solutions with an acid reaction, optimal values of polyphosphates in condition of neutralization of solutions are determined as 01–02%.

The above mentioned technological solutions are preferably prepared directly in the treated formation. For example, powder chemical agents for preparation of solution are filled in a transporting package, the package is delivered into an interval of treated formation, and then the transporting package is removed, for example by its dissolution with a dissolving liquid supplied into the well. The powder mixture is made from components, introduced into containers (capsules or mini containers) with soluble enclosure, and transported to the interval of intersection of productive formation, preliminarily separating it from lower and upper layers with a packer. Then, dissolution of container is performed, or a solvent for capsule casing and a solvent for agents are introduced into the productive layer. When the solution is ready, the inter-pipe space is cut off by packers, and the solution is pressed into the formation. This leads to an economy of reagents, their more accurate dosage, simplification of requirements for a material of column and a pumping mechanism, elimination of corrosion, etc. This increases the efficiency of treatment by more accurate composition of the treating fluid in the productive treated formation, reduces the consumption of agents, and protects equipment of action of chemical agents in the fluid. This approach significantly reduces the volume of required agents, increases the quality of treatment by more accurate correspondence of real working formation-treatment composition to a calculated composition, reduces requirements to equipment and increases its service life.

The transporting package can be formed as a mini container, such as capsules with a soluble enclosure, in particular with the use of starch, in form of balls. The calculated quantity of balls is thrown into the well and then water is poured on them. Starch is dissolved in water without residual and without any harm.

The method in accordance with the present invention is illustrated by the following examples:

EXAMPLE 1

Initial conditions. A treatment of an operating well with a diameter 8" is performed, with a carbonate collector of 164 ft. at the depth 6,562 ft. It is known that an elasticity module is $E=3\times10^5$ MPa, specific weight of rock $\gamma=125$ lb/ft$^3$. The well has an open shaft, and before treatment it has a yield 28.3 bbl/day.

Performed operations. It has been determined by geophysical methods that the porosity of the productive formation is 10%, density of the formation in a zone of support pressure $p=193.5$ lb/ft$^3$. Taking this into consideration, speed of cutting 0.45 hour per 1 ft. r and concentration of abrasive fluid 0.06 lb/ft$^3$ are selected. The composition of abrasive is a sand with grain size 0.008–0.04" and quartz content not less than 50%.

The ground equipment is installed which provides a pressure of the abrasive fluid 4,800 psi a predetermined concentration of abrasive fluid, washing of well, collection of stone material, and receipt of productive fluid. Then the underground equipment is connected, in particular a perforator engine with a perforator adjusted to the predetermined cutting speed 0.43"/minute. Then the underground equipment is lowered to the depth 6,562 ft. and after adjustment of the equipment of the depth, a slot cutting with the speed 4"/minute is performed. The cutting is performed approximately in (0.45×164=73.8 hours.

The Abrasive Hydrojet Perforation is performed only in approximately 75 hours instead of 150 hours in a known method. After the partial slot treatment, the productivity of the well increased over 60 bbl/day.

The required reduction of density of the rock in the zone of support pressure was calculated $$\Delta\rho = \frac{1\times 6562 \times (80\times 10^6 - 1250.125)}{3.10^{7}} = 1.75$$

The volume of rock to be treated is determined Depth of slotting not less then four diameters equivalent to 32", open slotting 4", then we can calcutae the volume of the slot:

$$V=32\times 4\times 164=132\ bbl.$$

Where productive layer in the formation equal 164 ft. as well as a required volume of acid:

$$132\times 0.1-3.2=10\ bbl.$$

3.2—volume without slotting
0.1—porosity of the collector
Then 10 bbl. of acid is pumped into an interval of treatment, it is pressed into the formation, and after the reaction the products of reaction are removed by draining. Then the geophysical observations were performed, and it was determined that the stresses in the zone of support pressure reduced to 60 MPa, while a radius of the zone of support pressure increased to 1.6 ft. The obtained reduction of permeability is determined as follows:

$$\Delta\rho = \frac{\rho(\delta_{y_1}-\delta_{y_2})}{E},\ \Delta\rho = \frac{6562(80-60).10^6}{3.10^{7}} = 0.84$$

The quantity of acid for the second cycle of treatment is calculated as follows.

$$\Delta\rho = 0.84\ lb/ft.^3 < 1.75\ lb/ft.^3$$

After this, another treatment of the productive interval was performed. The geophysical investigations were carried out, and an obtained reduction of density of the rock in the zone of support pressure was determined. A complete removal of stresses in the zone of support pressure made possible an increase in the productivity of the well even more than 20%.

The cost of the second stage of the method, which is the formation treatment, and the common time of two cycles was only about 6 hours with an insignificant cost and the use of relatively simple equipment.

Therefore, the total time of realization of the method in the given concrete case was correspondingly approximately 80 hour, which is approximately ½ when compared with the traditional methods of increasing the productivity of wells. The efficiency of treatment and the time of maintaining the obtained yield are at least identical.

The main advantage of the proposed method is a significant reduction of labor consumption and the cost of the method, with maintaining of increased efficiency. This is achieved mainly by a subdivision of the method into two controlled and regulated stages, and by optimal distribution of labor consumption and cost of the treatment between the two stages. Simultaneously, the method includes additional technological features, which increase its efficiency, namely a new selection of agents and preparation of a technological solution directly in the well.

The method takes into consideration that the zone of support pressure adjoining the well is the most responsible in the system of filtration of fluid from the formation into the well. The quantity of flowing fluid (gas) per unit of filtering area is increased in the second power when it approaches to the well. The highest intensity of streams is in this zone. This is the reason for the maximum "dirtying" of rocks with asphalt-resin and other deposits, which substantially reduce the productivity of the well.

It is therefore extremely important to reduce the tendency to accumulation of destroyed particles of rocks and drilling solution, to eliminate the zone of dirtying and near well zone which is subjected to the action of support pressure and is the most close to the bare zone which is the zone of support pressure.

The proposed invention significantly reduces labor consumption and costs of works for increasing productivity and unobjectionable movement of fluids in this zone, which explains cleaning of filtering passages and therefore long-term action of the obtained effect of treatment.

Figure 2:
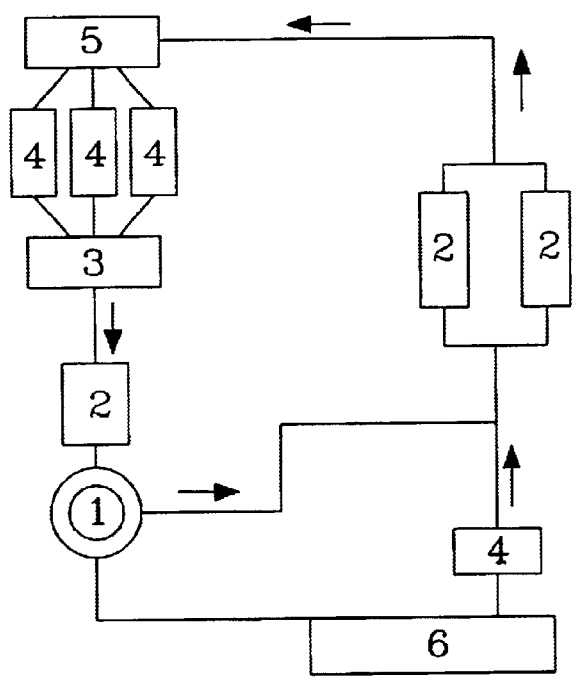
FIG. 2—surface equipment used for Abrasive Hydrojet Slotting Perforation

In FIG. 2 reference numeral 1 identifies a mouth of the well with a fountain equipment, reference numeral 2 identifies filters for cleaning of a pulp, reference numeral 3 identifies a block of manifolds, 4 is a pump aggregate, 5 is a sand mixing aggregate and 6 is a containment.

Figure 4:
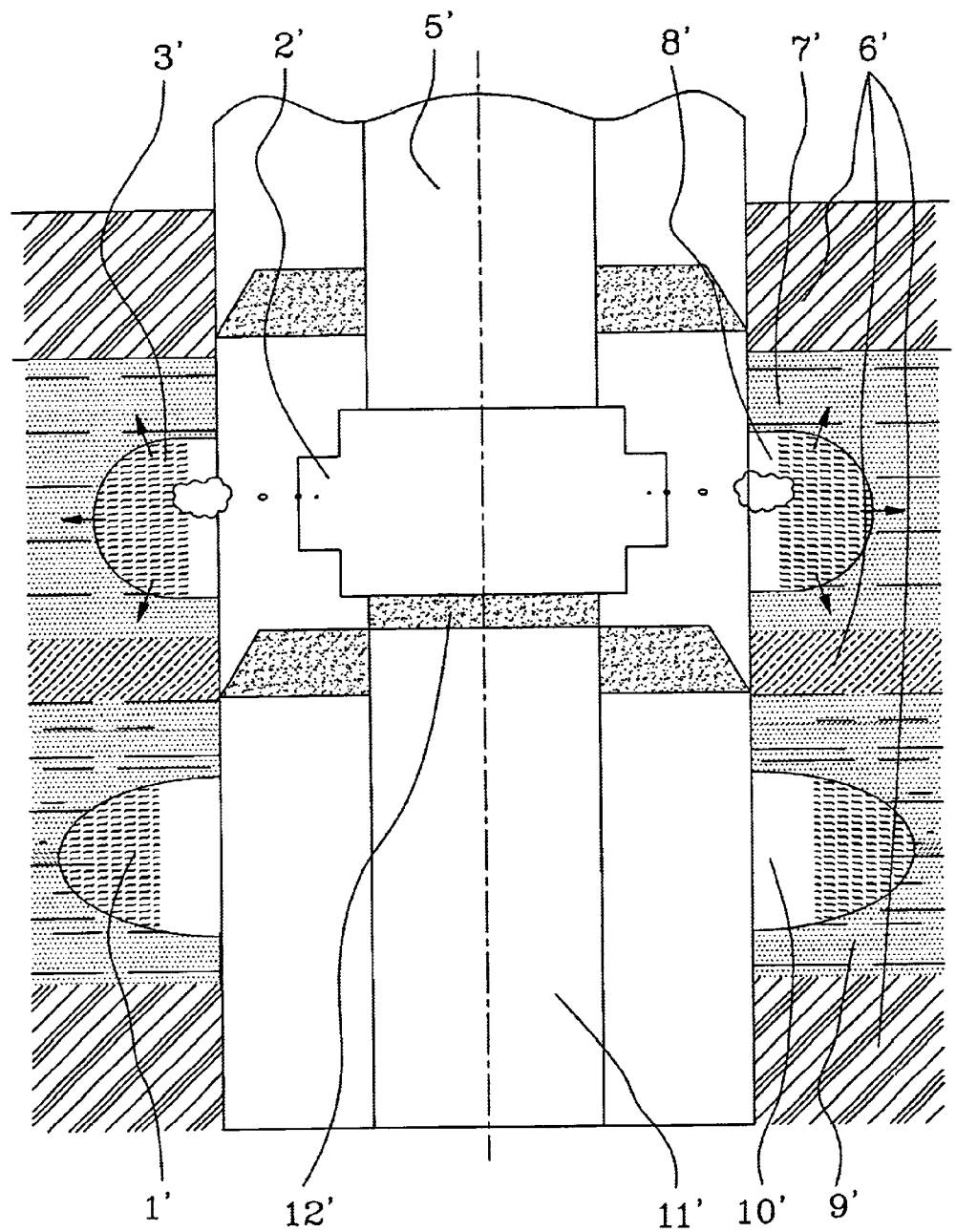
FIG. 4—detailed description of underground equipment used for Abrasive Hydrojet Slotting Perforation.

In FIG. 4 reference numeral 1 identifies a chemically treated part of a productive layer with worsened collector properties, while reference numeral 3 identifies a treated part of the productive layer with good collector properties. The other elements shown in FIG. 1 are: a perforator 2, packers 4, pumping compressor pipes with an engine of the perforator 5, non permeable rock 6, a productive layer with good collector properties 7, a cut through part of the productive layer with good collector properties, a productive layer with worsened collector properties 9, a cut through part of the productive layer with worsened collector properties, a tail part 11 and a plug 12.

It will be understood that each of the elements described above, or two or more together, may also find a useful application in other types of methods constructions differing from the types described above.

While the invention has been illustrated and described as embodied in the method of increasing productivity of oil, gas and hydrogeological wells, it is not intended to be limited to the details shown, since various modifications and structural changes may be made without departing in anyway from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of increasing the productivity of oil, gas and hydrogeological wells, comprising the steps of cutting slots only in a near well zone so as to perform a partial unloading of the well and to remove a part of support stresses; and cyclically treating the well with a formation-treating substance so as to remove a remaining part of the support stresses, with controlling a density of a formation and correcting the cyclical treatment in correspondence with the density of the formation.

2. A method as defined in claim 1, wherein said slot cutting includes cutting of slots only in a surrounding column, a cement layer, and a part of rock which immediately adjoins the well.

3. A method as defined in claim 2, wherein said slot cutting includes preliminarily determining a porosity of rock of the formation of the near well zone and a depth of a zone of support stresses, while the cyclical treatment is performed in dependence on the determined porosity and the depth.

4. A method as defined in claim 3, wherein when with the porosity of rock approximately 15% and higher, the slot cutting is performed to a depth 1–1.5 of a well diameter.

5. A method as defined in claim 3, wherein when the porosity is less than approximately 15%, the slot cutting is performed to the depth of not less than 4 well diameters.

6. A method as defined in claim 1, wherein said cyclical treatment includes, before each cycle determining a radius of a zone of support pressure and a maximum stress acting in it, and performing the cyclical treatment for all parts of a formation adjoining the well including the zone of support pressure, and after each cycle of the cyclical treatment controlling a change of density or permeability of rock in the zone of support pressure.

7. A method as defined in claim 6; and further comprising stopping of the cyclical treatment when a density of rock in the zone of support pressure reduces by a value determined in accordance with the formula $$\Delta\rho > K \cdot \rho(\sigma - \gamma H)E$$

wherein K is a coefficient of efficiency of treatment,

ρ is a density of rock of a non disturbed formation at the depth H, lb/ft$^3$,

σ is a maximum stress acting in the zone of support pressure MPa,

γ is a specific weight of rock of the formation lb/ft$^3$,

E is an elasticity module of rock of the formation MPa.

8. A method as defined in claim 1, and further comprising introducing the formation-treating substance in form of jets.

9. A method as defined in claim 8, wherein the formation-treating substance includes solutions of $NaHSO_4 \times H_2O$ and/or $(NH)_4S_7O_8$ with concentration 4–7% and with admixtures of anion active surface active substance or a mixture of anion active and non ionogenic surface active substance with concentration 0.5–2%.

10. A method as defined in claim 8, wherein the formation-treating substance includes a solution of $NH_2SO_4H$ with admixtures of anion active surface active substance or a mixture of anion active and non ionogenic surface active substance with concentration 0.2–0.4% and polyphosphate with concentration 0.1–0.2% or solution of $CH_3COCl$ with concentration 6–2% with admixtures of anion active surface active substance or a mixture of anion active and non ionogenic surface active substance with concentration of 0.5–1% and a polyphosphates with concentration 0.1–0.2%, and the polyphosphates include $Na_5P_3O_{10}$ and/or $Na_2[Na_n(PO_3)6]$.

11. A method as defined in claim 1, and further comprising preparing the formation-treating substance directly in a well, and in an interval of a formation.

12. A method as defined in claim 11, wherein said preparing of the formation treating substance including using chemical agents in a transporting package, delivering the transporting package with the agents into the formation, and removing the transporting package.

13. A method as defined in claim 12, wherein said removing includes removing the transporting package by a method selected from the group consisting of dissolving with a solution which fills the well and supplying a dissolving liquid into the well.

14. A method as defined in claim 12; and further comprising using as the transporting package a microcontainer formed as a capsule with soluble wall.

15. A method as defined in claim 14; and further comprising using a soluble polyesthylene film as the soluble wall.

16. A method as defined in claim 14; and further comprising making the microcontainer from a binder, which is soluble in water without residues.

17. A method as defined in claim 16; and further comprising using starch as the binder.

18. A method as defined in claim 14; and further comprising forming the microcontainer with a shape selected of the group consisting of a ball shape and a cylinder shape.

* * * * *